United States Patent [19]
Malek et al.

[11] Patent Number: 5,822,313
[45] Date of Patent: Oct. 13, 1998

[54] SEAMLESS HANDOVER IN A CORDLESS TDMA SYSTEM

[75] Inventors: Charles J. Malek, Crystal Lake, Ill.;
David L. Weigand, Sunnyvale, Calif.;
Dennis M. Rose, Sunnyvale, Calif.;
Gerard G. Socci, Palo Alto, Calif.

[73] Assignee: National Semiconductor Corporation, Santa Clara, Calif.

[21] Appl. No.: 655,355

[22] Filed: May 24, 1996

[51] Int. Cl.[6] ........................................ H04J 3/16
[52] U.S. Cl. .......................... 370/332; 370/333; 370/337; 370/347; 455/442
[58] Field of Search ..................... 370/313, 314, 370/328–333, 336, 337, 431, 442; 379/56, 58, 59, 60; 455/422, 432, 436, 442, 39, 226.1, 226.2, 226.3, 516, 517, 524

[56] References Cited

U.S. PATENT DOCUMENTS

| | | | |
|---|---|---|---|
| 5,323,446 | 6/1994 | Kojima et al. | 370/332 |
| 5,416,778 | 5/1995 | Chan et al. | 370/332 |
| 5,483,668 | 1/1996 | Malkamaki et al. | 370/331 |
| 5,530,693 | 6/1996 | Averbuch et al. | 370/331 |
| 5,533,027 | 7/1996 | Akerberg et al. | 370/347 |
| 5,548,808 | 8/1996 | Bruckert et al. | 370/332 |
| 5,577,047 | 11/1996 | Persson et al. | 370/337 |
| 5,613,203 | 3/1997 | Dupuy et al. | 370/337 |

*Primary Examiner*—Benedict V. Safourek
*Assistant Examiner*—Seema S. Rao
*Attorney, Agent, or Firm*—Skjerven, Morrill, MacPherson, Franklin & Friel LLP; Brian D. Ogonowsky

[57] ABSTRACT

A technique is disclosed for allowing a seamless handover between base stations in a TDMA controller as a telephone handset is transported from one base station's area to another. The disclosed circuitry enables the TDMA controller to assess the quality of the handover before switching to the new base station. When it is determined that a handover operation is to commence, transmissions are made in the original slot time and a handover slot time within the same frame. Also during the same frame, data is received at two separate slot times. Only when it is determined that the data received in the handover slot time contains no transmission errors is the handover completed by then only transmitting on the handover slot transmit time and receiving on the handover slot receive time. In the preferred embodiment, it is determined whether the received data contains no transmission errors by detecting the CRC codes, the signal strength, and the existence of any invalid words.

16 Claims, 7 Drawing Sheets

SEAMLESS HANDOVER IN A CORDLESS TDMA SYSTEM

CROSS-REFERENCE TO RELATED APPLICATIONS

This application is related to U.S. application Ser. No. 08/621,266, filed on Mar. 21, 1996, now pending, entitled "Multi-Tasking Sequencer For a TDMA Burst Mode Controller." This application is also related to U.S. application Ser. No. 08/655,576, now U.S. Pat. No. 5,666,366, entitled "Inter-Base Synchronization Technique for a TDMA Communication System," and to U.S. application Ser. No. 08/653,531, filed herewith, entitled "Audio Error Mitigation for a TDMA Communications System now pending." The above applications are assigned to the present assignee and incorporated herein by reference.

1. Field of the Invention

This invention relates to time division multiple access (TDMA) communication systems and, in particular, to a handover technique for dynamically transferring communication support for a cordless handset to another base station in a TDMA system.

2. Background

In a TDMA communication system, a number of transmitters can transmit on the same frequency channel, but at different times. A remote receiver for receiving a particular transmitted signal knows beforehand at what time the transmitted signal will occur and receives only during that time. The use of TDMA makes very efficient use of the frequency spectrum since multiple users may use the same frequency channel at the same time without interfering with one another.

FIG. 1 illustrates one type of TDMA system where handheld wireless telephones 10 and 11 share a same frequency channel while transmitting to and receiving from a nearby base station 12. All communications made by telephones 10 and 11 are routed through base station 12 as long as telephones 10 and 11 are in the vicinity of base station 12. The various base stations in the TDMA system are connected to the public telephone lines (not shown).

Additional wireless telephones 13 and 14 are also shown in FIG. 1. Telephone 13 routes its communications through its closest base station 15, and telephone 14 routes its communications through its closest base station 16. The various base stations 12, 15, and 16 convert the received TDMA signals from the handheld telephones 10, 11, 13 and 14 to conventional analog POTS, BRI, or PRI signals for transmission over the telephone lines. Similarly, the base stations 12, 15, and 16 convert the received information on the telephone lines to TDMA signals for transmission to the handheld telephones 10, 11, 13, and 14. Thus, all of the handheld telephones 10, 11, 13 and 14 can communicate with another telephone inside or outside of the TDMA system.

The base stations 12, 15, and 16 receive or transmit time-division multiplexed signals simultaneously. To avoid co-channel interference between telephones using neighboring base stations, neighboring base stations generally operate on different frequency channels, where the frequency channel is automatically selected to minimize co-channel interference. Such a TDMA system may be the Personal Handy Phone System, common in Japan, whose requirements are described in the RCR Standard-28, incorporated herein by reference. As an alternate embodiment, such a TDMA system may be the European ETSI DECT standard, also incorporated herein by reference. Another such alternate embodiment may be the North American PACS standard. Further, slow frequency hopping systems, compliant with CFR Title 47, part 15, and intended for the U.S. ISM-bands, may be derived from the aforementioned formal standards. The operation of such TDMA systems are well known.

In a TDMA system, each wireless telephone 10, 11, 13, and 14, when active, is allocated certain time slots within which it may transmit a bursted signal or receive a bursted signal. FIG. 2 illustrates a frame 17 containing slots 0 through 7, where frame 17 is repeated on a single frequency channel. Other TDMA systems may use 24, 32, or other number of slots in a frame. The period of frame 17 may be, for example, 5 milliseconds. Assuming wireless telephones 10 and 11 in FIG. 1 are being actively used at the same time, telephones 10 and 11 may be allocated slots 0 and 1, respectively, for transmitting bursted signals to base station 12, while allocated slots 4 and 5, respectively, for receiving bursted signals from base station 12. Two additional telephones (e.g., 13 and 14) entering the vicinity of base station 12 may use the available slots 2, 3, 6, and 7 in a similar manner. The amount of information stored in each telephone 10, 11, 13, and 14 during a frame period is transmitted in a burst within a single slot.

A sample protocol 18 for a slot is also shown in FIG. 2, where protocol 18 dictates the information required to be transmitted during a single slot. Protocol 18 may consist of a ramp-up field 20, a start symbol field 21, a clock recovery field 22, a slot sync (or Unique Word) field 23, a data field 24, a CRC field 25 (for error correction and verification), and a guard band field 26. The lengths and types of fields in a protocol vary depending on the mode of the transceiver (e.g., registration mode, paging mode, call set up mode, transmit/receive mode, etc.). While in the traffic mode, where voice is to be transmitted, data field 24 contains audio data. Data field 24 is referred to as the traffic channel or TCH.

In one embodiment, the bit rate of the transmitted bits in a frame 17 is approximately 384 K bits per second, and the modulation technique is $\pi/4$DQPSK. Therefore, the corresponding symbol rate is 192 K symbols per second.

As the wireless telephones are transported in their communication mode to different areas handled by different base stations, there must be a non-detectable handover to another base station. Such a handover may require the telephone to transmit/receive in a different slot pair within a frame whether on the same frequency channel or a different frequency channel. To achieve such a handover and to maximize the use of the channel, each base station and wireless telephone transmits/receives slots and frames in synchronization so as to align the various slot times within a frame throughout the TDMA system.

Handovers between base stations are frequently accompanied by an audible noise indicating a transmission error. Since the handover is completed prior to the transmission errors being detected, there is no way to recover the lost audio data or to mitigate the audible noise. What is needed is a seamless handover technique which avoids transmission errors upon a handover.

SUMMARY

A technique is disclosed for allowing a seamless handover between base stations in a TDMA controller as the telephone handset is transported from one base station's area to another. The disclosed circuitry enables the TDMA controller to assess the quality of the handover before switching to the new base station and provides a minimal-delay, optimally buffered implementation. When it is determined that a handover operation is to commence, transmissions are made in two slot times (the original slot and the handover slot) within the same frame. Also during the same frame, data is received at two separate slot times. Only when it is determined that the data received in the handover slot time contains no transmission errors is the handover completed by then only transmitting on the handover slot transmit time and receiving on the handover slot receive time.

In the preferred embodiment, it is determined whether the received data contains no transmission errors by detecting the CRC codes, the signal strength, and the existence of any invalid words.

DETAILED DESCRIPTION OF THE PREFERRED EMBODIMENTS

Overview of TDMA Controller

Figure 1:
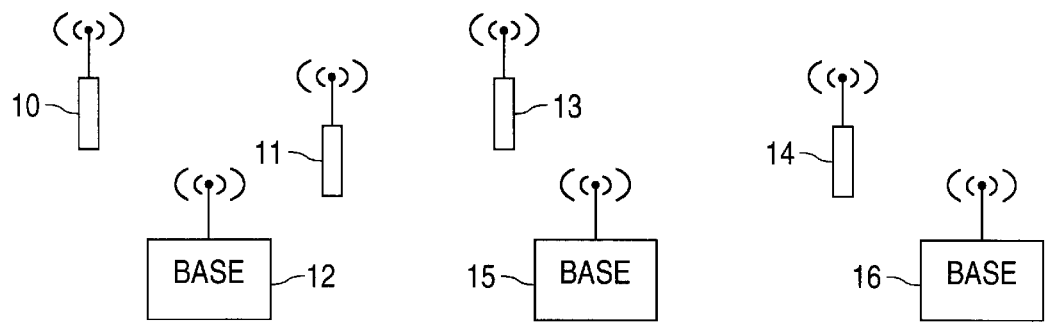
FIG. 1 illustrates a prior art TDMA system consisting of stationary base stations and portable telephone transceivers.
Figure 3:
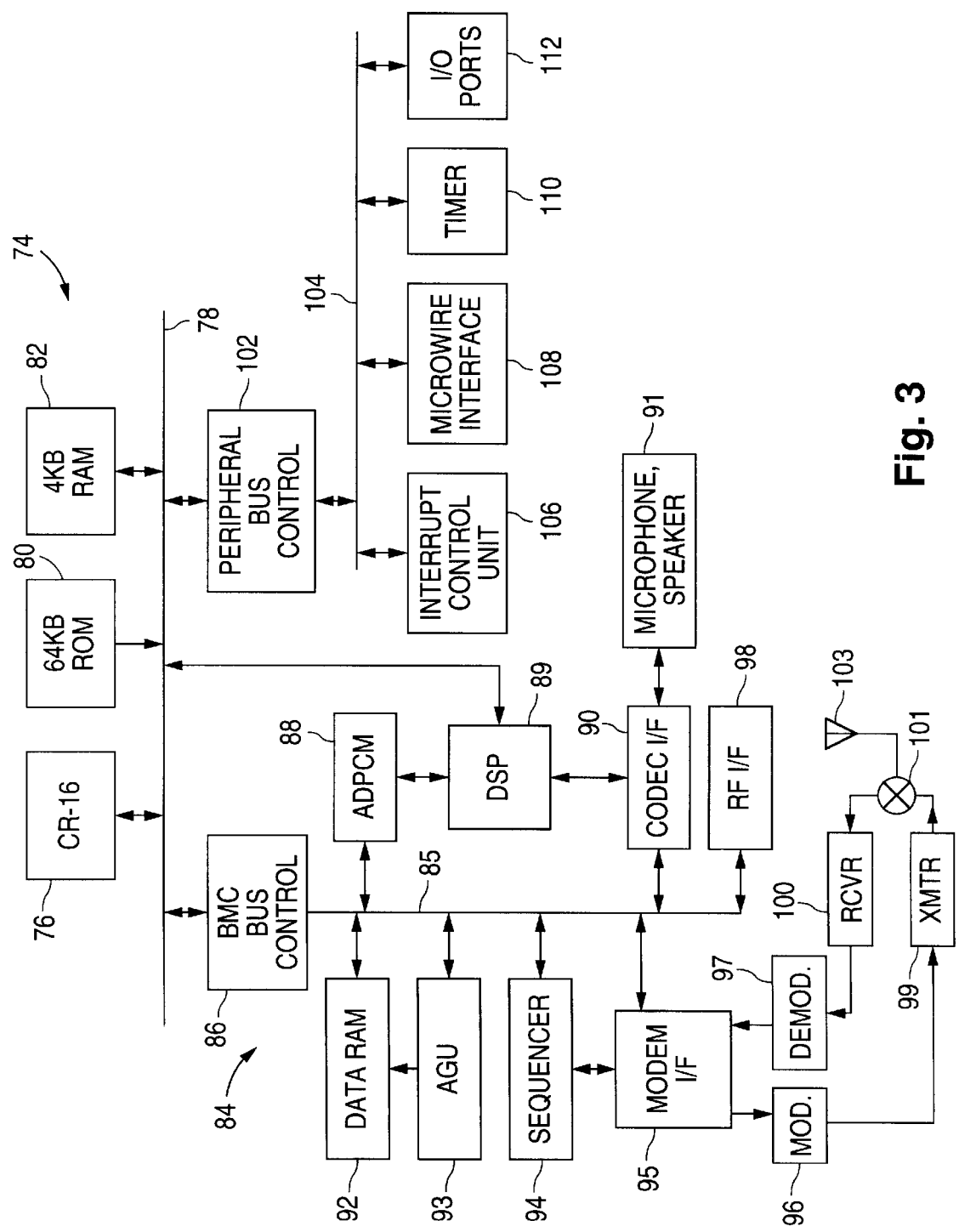
FIG. 3 illustrates the basic architecture of the preferred embodiment TDMA system transceiver.

FIG. 3 illustrates the preferred embodiment TDMA controller architecture incorporating certain novel features. This architecture may be used in a TDMA system such as shown in FIG. 1. The controller of FIG. 3 is the same for the base stations and the handheld wireless telephones in the TDMA system. The TDMA controller 74 includes a microprocessor 76, such as a model CR-16 from National Semiconductor Corporation, for high level control over the TDMA controller functions. The Microprocessor 76 is connected to a system bus 78 along with a program ROM 80 and static RAM 82. RAM 82 is used for storing information for various purposes, such as storing program variables, mailbox information, and stack parameters.

A burst mode controller (BMC) 84 for creating the slots for transmission at precise times is also connected to system bus 78 and consists of a number of components. A BMC bus 85 is connected to system bus 78 via a BMC bus controller 86, whose general function would be understood by those skilled in the art.

An adaptive differential pulse code modulation (ADPCM) voice coder 88 provides encoding and decoding of audio information. A digital signal processor 89 interacts with voice coder 88 and an interface unit 90 to generate the audio information bits to be transmitted.

A microphone and speaker 91 in the telephone handset are connected to interface unit 90. In the base station, interface unit 90 is connected to the land-line network connection.

A slot opcode data RAM 92 contains certain protocol bits, address bits, and data bits which will be called upon during operation of the TDMA controller to build a slot for transmission or to store a received slot. An address generation unit (AGU) 93 addresses the information in RAM 92 under the control of a sequencer 94. Sequencer 94, which will be described in greater detail later, is the device that controls assembling the slots for transmission, and disassembling the slots after reception, at synchronized times by outputting control flow sequences to the modem interface unit 95.

Modem interface unit 95 receives control signals from sequencer 94 and, in response, retrieves the bits from various sources, such as data RAM 92, for building the serial bit stream in a slot. Modem interface unit 95 also distributes the bits in a received slot to the appropriate destinations for further processing by the microprocessor and the ADPCM engine.

Figure 2:
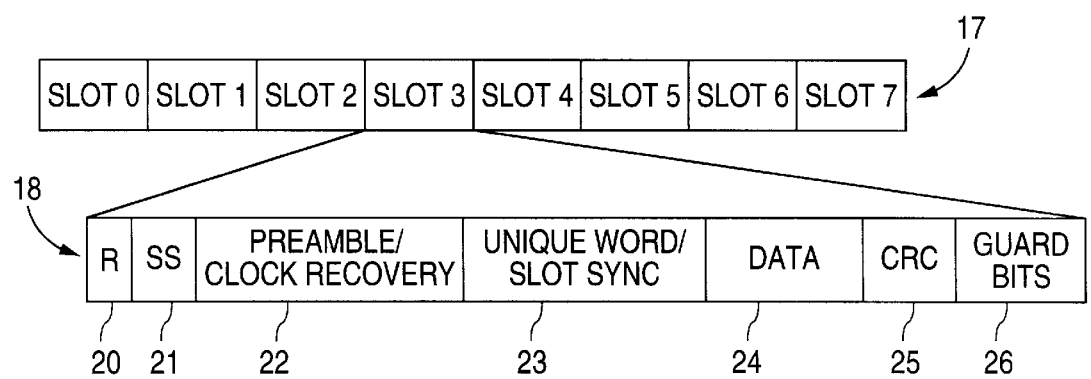
FIG. 2 illustrates a single frame containing slots which are transmitted/received on a single frequency channel in a conventional TDMA system.

The serial bit stream for transmission by transmitter 99 is sent to a modulator 96, while a demodulator 97 sends a received bit stream from receiver 100 to modem interface unit 95 for processing. The demodulator 97 also contains modules for performing clock and slot synchronizing (using the Unique Word field 23 and the Preamble in FIG. 2), whereby attaining a high positive correlation of synchronization/clock codes cause demodulator 97 to issue synchronization signals to sequencer 94. Encryption/decryption circuitry may be connected to the modulator 96 and demodulator 97.

An RF interface 98 circuit is also included. The RF interface 98 circuit is typically comprised of an additional microwire interface intended to load a PLL synthesizer(s) in the RF deck and also provides control signals to the RF deck, such as various transmit/receive, power down, antenna steering, or Received Signal Strength Indicator (RSSI) capture signals.

A transmit/receive switch 101 and antenna 103 are also shown.

The peripheral devices and their controllers are also connected to system bus 78. Such devices, include, for example, a peripheral bus control 102 for coordinating access between the system bus 78 and the peripheral bus 104, an interrupt control unit 106, a microwire interface 108 for interfacing with, for example, a digital answering machine, a timer 110, and the various input/output ports 112 which are connected to, among other things, a transmitter and receiver portion of the transceiver.

Since this disclosure primarily deals with the operation and construction of certain novel circuits and architecture within the TDMA system, the remaining hardware may be conventional or slightly modified in view of the novel circuits and architectures.

Figure 4:
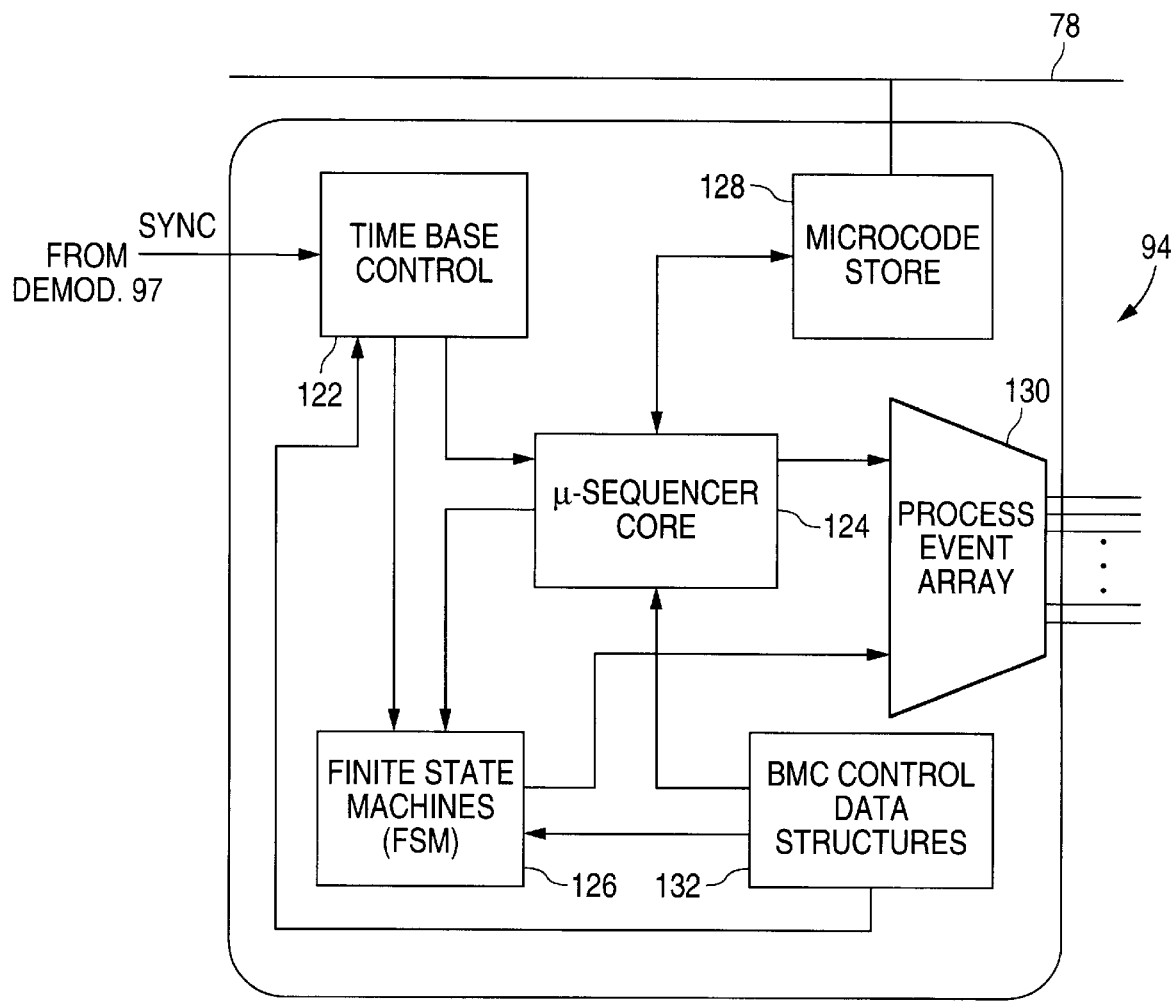
FIG. 4 illustrates additional detail of the preferred sequencer used in the TDMA transceiver.

Description of Sequencer 94 As previously mentioned, the operation of sequencer 94 in the TDMA controller is to issue precisely bit-timed multiple control flow signals to the modem interface unit 95 in order to assemble or disassemble the slots within a frame and ensure the bits within the slots are synchronized with the base station transceiver. FIG. 4 illustrates the pertinent portions of sequencer 94. Additional detail of sequence 94 is found in U.S. application Ser. No. 08/621,266, filed Mar. 21, 1996, entitled "Multi-Tasking Sequencer For a TDMA Burst Mode Controller," by David Weigand and Charles Malek.

Sequencer 94 includes a core 124 which contains conditional logic circuits and an address generation unit (AGU) for selecting a next address in the microcode store 128. The AGU can cause the microcode sequence to jump to an appropriate subroutine, such as a set-up, paging, RSSI, transmit, or receive subroutine.

A time base control 122 which is generated from the recovered receive clock in a handset outputs frame, slot, and bit pointer signals synchronized with the bit rate of the base station (e.g., base station 12 in FIG. 1). Synchronization of a slot within the handset with the allocated slot time may be performed by correlating the Unique Word field in a slot with the expected Unique Word (FIG. 2) transmitted by the base station.

If the controller is located in a base station, time base control 122 outputs frame, slot, and bit pointer signals which are synchronized with a master base station. Any base station can be a master or a slave base station. The RF transmission of each base station contains a Unique Word in each slot in the frame. Upon receiving the transmission and correlating the Unique Word field against the expected Unique Word, a frame sync pulse is derived.

One base station is designated a master base station, and the other base stations, acting as slave base stations, synchronize to the master base station by synchronizing their frame pointers to the master frame pointer. Depending on the arrangement of base stations, synchronization can be performed in a ladder fashion where synchronization is performed by slave base stations receiving sync signals from other slave base stations, or performed in a star fashion where all the slave base stations receive the sync signal directly from the master base station.

The time base control 122 provides the timing signals to the sequencer core 124 and to the finite state machines (FSMs) 126.

The microcode store 128, which may be ROM or RAM based, contains a series of commands for the sequencer core 124, which in turn provides enabling commands to the FSMs 126. Microcode store 128 is connected to microprocessor 76 in FIG. 3 via bus 78. The microcode instructions need not specify each step for creating a slot protocol, such as protocols 140 and 142 in FIG. 5, since the FSMs 126 now perform the function of building the protocols. For example, when a voice transmit sequence is to begin, the microcode store 128 provides an initiate voice transmit command to the micro-sequencer core 124 which then enables the proper FSM 126 to build a slot for the transmit function. In a preferred embodiment, microcode store 128 also contains certain command flow sequences which are sometimes output from the sequencer 94 along with a FSM command flow sequence.

Figure 5:
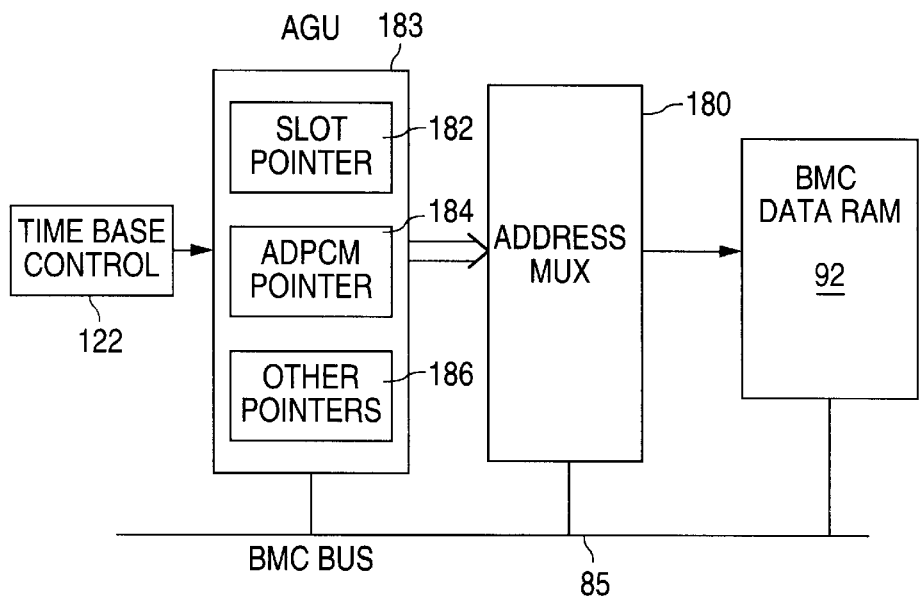
FIG. 5 illustrates an address generation unit (AGU) for addressing data stored in a memory and for retrieving data stored in the memory.

Each of the FSMs 126 is a hardware state machine which provides a sequence of control codes synchronized with the bit rate clock provided by the time base control 122. The FSM 126 control codes are then applied to the inputs of the process event array 130, which acts as a combiner and re-times the sequencer's 94 output. The control codes output by sequencer 94 on bus 85 and to modem interface unit 95 (FIG. 3) essentially enable and disable various devices and operations in the proper sequence and at the proper times to build a slot in the appropriate protocol as shown in FIG. 5. For example, the fixed codes in the Ramp, Start Symbol, Preamble, and Unique Word fields may be inserted into a slot at the proper times by enabling fixed parallel-to-serial storage devices containing those fixed codes. These storage devices may be located in modem interface 95 in FIG. 3.

Audio data for the voice field may be inserted into a slot by first converting the analog audio signals into the ADPCM format and storing the ADPCM data into the appropriate transmit slot location in the Data RAM 92 using an ADPCM channel pointer. The ADPCM data is then addressed at the appropriate time by a slot pointer and transferred to parallel-to-serial circuitry in modem interface unit 95. Cyclic Redundancy Clock (CRC) data may be inserted by instructing a CRC unit in modem interface unit 95 to generate the CRC data. Similarly, audio data from a received slot is stored in the appropriate receive slot location in the Data RAM 92 using the slot pointer. This received data is later addressed by the ADPCM pointer for later decoding and further processing.

The BMC control and data structure block 132 in FIG. 4 contains opcode registers for each of slots 0–7 and contains any other data which may be used by FSMs 126 and sequencer core 124, such as the lengths of the various fields in the protocols. The various patent applications incorporated herein by reference provide addition detail of the opcodes.

Description of Seamless Handover

The preferred embodiment TDMA controller includes circuitry for allowing a seamless handover between base stations as the telephone handset is transported from one base station's area to another. In the past, a handover from one base station to another simply caused the handset to cease transmitting and receiving via the old base station, and on the next frame, begin transmitting and receiving via the new base station. A low signal strength (RSSI), CRC errors, or an invalid ADPCM code word, frequently indicates transmission errors between the handset and the new base station upon handover. Since these errors are only discovered after the handover to the new base station, there was no way of obtaining the lost data.

The preferred embodiment TDMA controller in this disclosure contains circuitry which avoids the drawbacks of the prior art by allowing the TDMA controller to assess the quality of the handover before switching to the new base station. This technique is particularly useful where the system is a slow-frequency hopper with slot diversity and handover may occur at every frame.

FIG. 5 illustrates the address generation unit (AGU) 93, previously mentioned with respect to FIG. 3, receiving a clock signal from the time base control 122 in sequencer 94 and outputting addresses for addressing data in RAM 92 via address mux 180. Slot pointer 182 provides the addresses in RAM 92 of the ADPCM data which is to be transmitted in a slot or the addresses in RAM 92 of the ADPCM data which have just been received from a slot. Each slot time has a predetermined starting address, obtained from a look-up table, in RAM 92. The operation of address pointers is well known and only the nonconventional features of the pointers used in the preferred embodiment TDMA controller will be discussed in detail.

An ADPCM pointer 184 addresses the received data stored in RAM 92 to enable the data to ultimately be converted from ADPCM signals into analog signals and applied to a speaker in the handset. The ADPCM pointer 184 also stores the ADPCM data from the ADPCM engine 88 (FIG. 3) into the appropriate slot location in RAM 92 for transmission.

Other pointers 186 may also be employed for supporting the other functions of the TDMA controller. The novel handover technique will be described with respect to the flowchart of FIG. 8 and the illustrations in FIGS. 6, 7, and 9.

Figure 6:
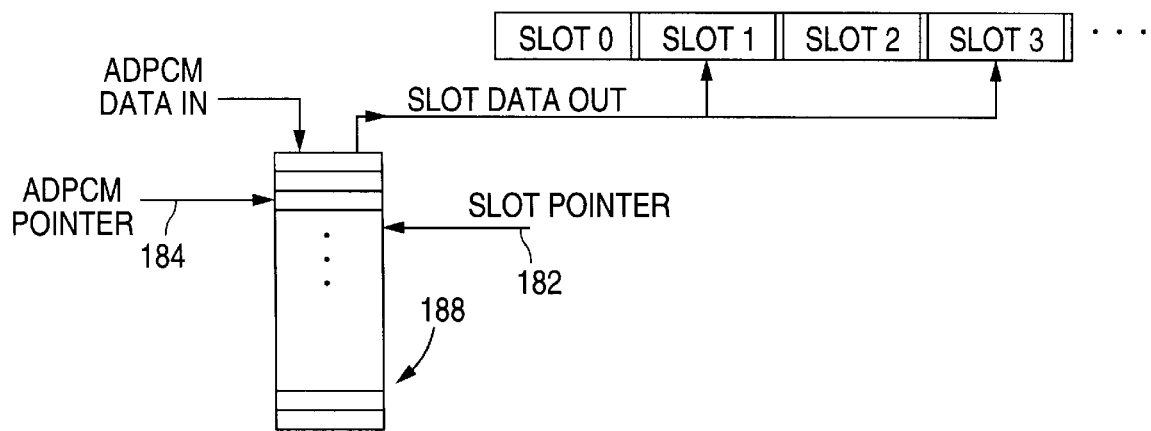
FIG. 6 illustrates a transmit process with the ADPCM channel pointer storing data in the memory and a slot pointer (acting as a transmit pointer) retrieving data from the memory for transmission during a seamless handover.

When a handset is in the vicinity of an original base station, it transmits on, for example, slot 1 and receives on slot 5 in a conventional manner. As the handset is transported to within an area supported by another base station, the carrier/interference (C/I) signal ratio and CRC status of the new base station is detected and indicates to the handset that a handover to the new base station is to commence. Circuitry for detecting such a base station signal and for commencing a handover is well known. Circuitry for determining the CRC status and base station signal may be located in demodulator 97, modem interface unit 95, and microprocessor 76. Instead of simply now transmitting on the allocated slot (e.g., slot 3) for the new base station and ceasing transmissions to the old base station, the present method transmits on both the old slot and the new allocated slot within a single frame, as shown in FIG. 6. The two slots may be on different frequency channels.

FIG. 6 shows a portion of the RAM 92 which will be referred to as a slot buffer 188. Such transmission in two slots may be performed by causing the slot pointer 182 to address the data in slot buffer 188 at slot time 1 and later at slot time 3.

Figure 7:
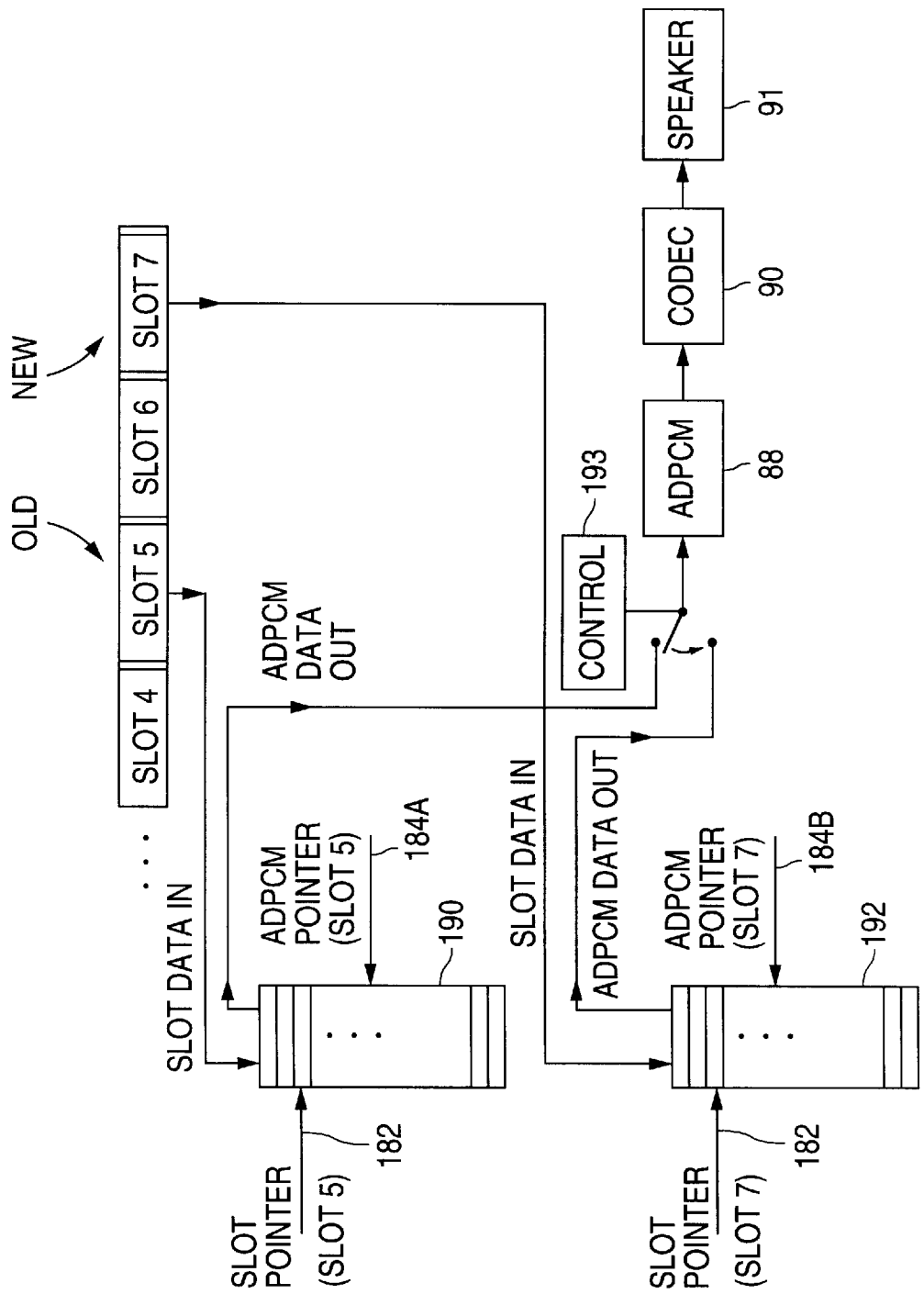
FIG. 7 illustrates a receive process with the slot pointer (acting as a receive pointer) storing the received data in the memory and the ADPCM channel pointer retrieving data from the memory for further processing during a seamless handover.

Within the same frame, data is received from the old base station in slot 5 and data from the new base station is received in slot 7, as shown in FIG. 7. The data in slot 5 is shown stored in slot buffer 190 while the data in slot 7 is shown stored in slot buffer 192.

After the slot is received from the new base station, the CRC field is checked to determine if any errors exist in the slot, and the signal strength (RSSI) is detected to determine whether the RSSI is above a threshold for reliable reception. Additionally, the received data is inspected for any invalid code words (e.g., an all zero word or nibble), which is not defined by the G.721 vocoder algorithm, since this would also indicate a transmission error.

Control data and audio data may exist in the information field of a slot. The control data provides information such as the base station identification. In certain TDMA systems, there is a CRC error code for the control data (called A-CRC) and a CRC error code for the audio data (called X-CRC). If either the A-CRC or X-CRC codes fail to match, then there is an assumed to be an audio error.

The RSSI threshold is system dependent and is selected based upon a C/I ratio which would give rise to an objectionable error rate.

The circuitry for determining whether the above criteria is met may be included in the demodulator 97, modem interface 95, or microprocessor 76. One skilled in the art would understand the simple logic circuitry necessary to make the determination.

Once the determination has been made that the handover is adequate by meeting the above criteria, a control circuit 193 (FIG. 7) then switches the ADPCM engine 88 from processing the data from buffer 190 (old slot) to processing the data from buffer 192 (new slot).

Thus, the switchover from the original base station to the new base station is only made once it has been determined that a satisfactory handover has indeed been accomplished. The ADPCM pointers 184*a* and 184*b* for both slot buffers 190 and 192 simultaneously address the same byte positions in buffers 190 and 192 such that a portion of the slot applied to the ADPCM engine 88 will be obtained from slot 5 while a second portion, after the handover, will be obtained from slot 7. Such a handover will be transparent to the user since no slot data is lost.

After the handover, the handset operates in a conventional manner by transmitting and receiving on a single slot pair.

Figure 8:
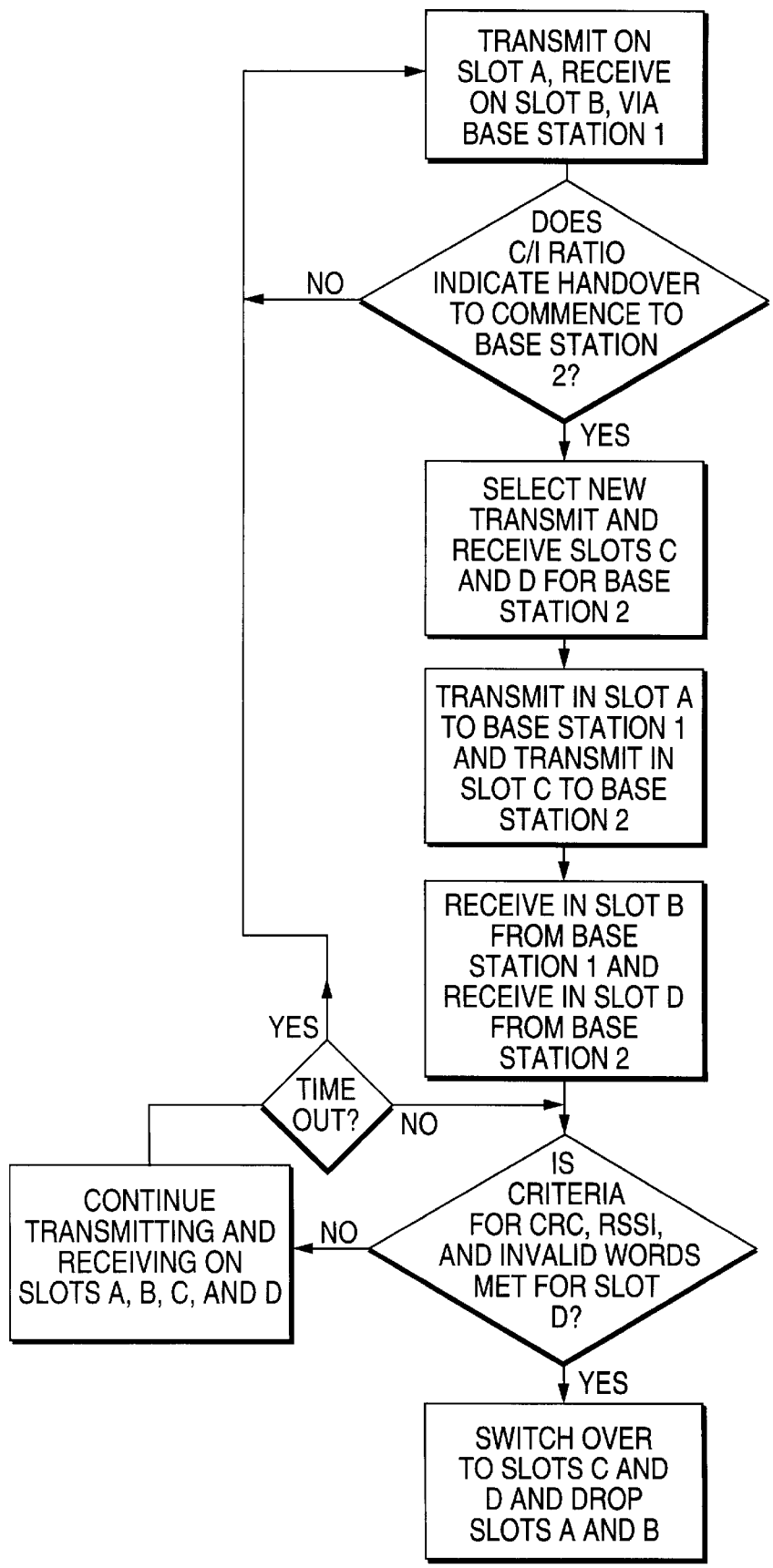
FIG. 8 is a flowchart of the preferred seamless handover technique.

If the above-mentioned criteria for a handover have not been met, the four slots are used for receive and transmit until a predetermined period has been exceeded. At that time, a time-out is called by the algorithm, and the handover operation is temporarily abandoned, as shown in FIG. 8.

Figure 9:
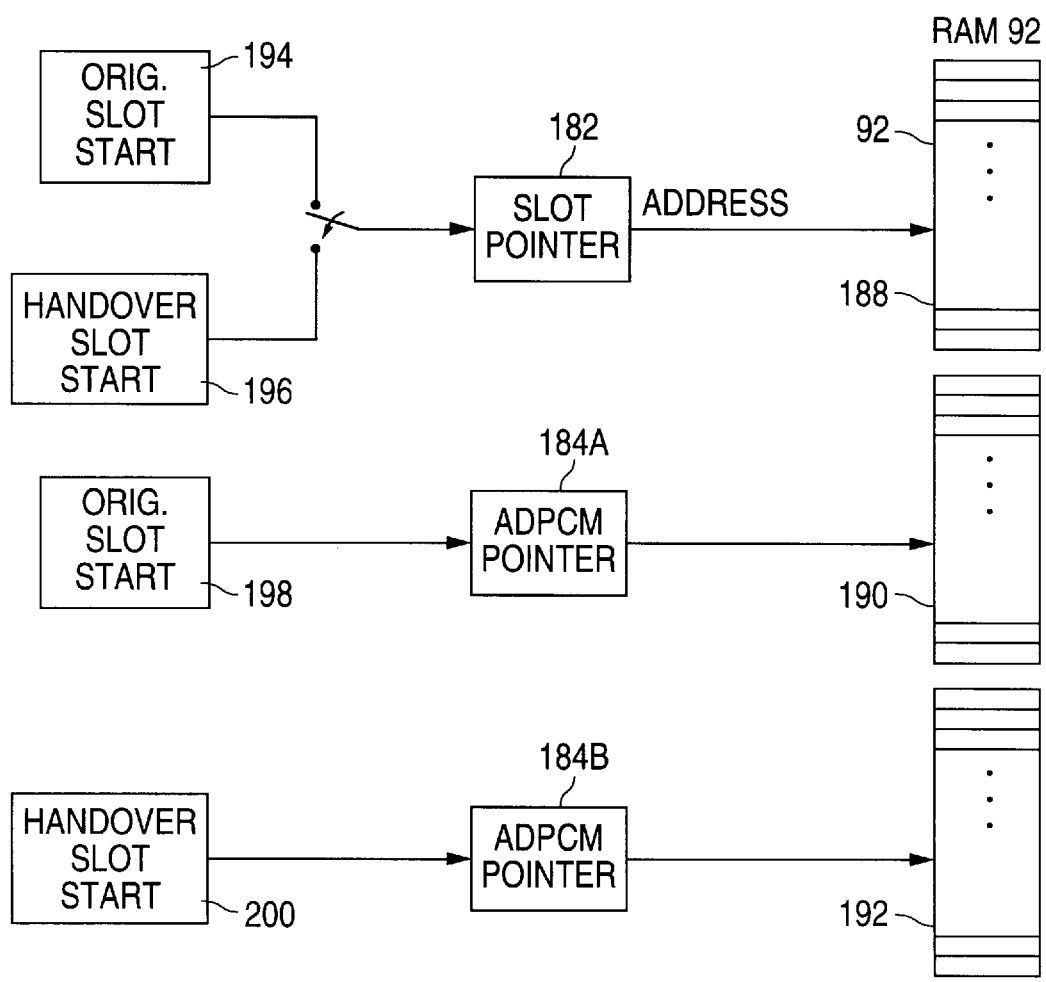
FIG. 9 illustrates a technique for controlling the pointers of FIGS. 5–7 to operate at two slot times within a frame.

FIG. 9 illustrates the indexing of the slot pointer 182 and the ADPCM pointers 184*a* and 184*b* during a handover operation. The slot pointer 182 (acting as a transmit pointer) is preset to transmit the data in transmit buffer 188 at the original slot start position 194 and, after completion, then preset to transmit the same data at the handover slot start position 196.

To achieve a seamless handover, the preferred handover slot start position 196 indexes the slot pointer 182 within the slot time (i.e., does not start the slot pointer 182 at the 0 position within the transmit buffer 188) to take into account the number of ADPCM bytes (or samples) generated between the two transmit slot times. For example, as the handover slot time occurs later in time, the slot pointer 182 must transmit the ADPCM bytes starting from a later sample. One skilled in the art could readily derive this offset by determining the number of ADPCM bytes generated per slot time.

For reception, ADPCM pointer 184*a* and ADPCM pointer 184*b* both begin at byte 0 of their respective slot buffers 190 and 192 and sequence simultaneously. ADPCM pointer 184*a* begins at the original slot starting address 198, and ADPCM pointer 184*b* begins at the handover slot starting address 200. Hence, when the handover is made by control circuit 193 in FIG. 7, the next byte routed to the ADPCM engine 88 from buffer 192 will be the correct byte to follow the byte from buffer 190 previously routed to the ADPCM engine 88 with no data lost.

Control over the various pointers is provided by the sequencer 94 in FIG. 4. The signalling of a handover operation within sequencer 94 may be made using opcodes, associated with each slot, stored in the BMC Control Data Structures 132 block in FIG. 4. A conditional logic circuit in sequencer core 124 senses the opcode and causes microcode store 128 to jump to the appropriate subroutine. The opcodes are stored under the control of microprocessor 76 in FIG. 3.

Thus, a technique has been shown which provides a seamless handover without loss of data even when transmission errors exist at the initiation of a handover operation. The inventive circuit ensures that there are no transmission errors prior to the handover being completed.

Conclusion

This disclosure primarily focuses on those non-conventional features of a TDMA controller. Those circuits typically used in TDMA controllers which have not been described in detail may generally be conventional circuits using conventional algorithms. For example, conventional circuits and algorithms may be used to calculate and compare the CRC codes and to determine RSSI. The concepts described herein may be applied to any TDMA controller. While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A device for use in a TDMA communication system, said system including a plurality of base stations for transmitting bursts of data within time slots to handsets and receiving bursts of data within time slots from said handsets, said slots being arranged in frames, said device comprising:

a means for determining whether a handover operation is to be commenced for transferring communication support for a cordless handset from an original base station to a handover base station in a TDMA system;

a transmit buffer for storing data to be transmitted;

a first receive buffer for receiving data from a first burst;

a second receive buffer for receiving data from a second burst;

a switch connected to said first receive buffer and said second receive buffer;

a decoder connected to said switch for receiving data within said first receive buffer or said second receive buffer, depending on a position of said switch;

a first addressing means for addressing locations in said transmit buffer for transmitting said data in said transmit buffer in an original slot transmit time and in a handover slot transmit time within a single frame;

a second addressing means for addressing locations in said first receive buffer at particular times for storing data received in an original slot receive time and for addressing the same locations at said particular times in said second receive buffer for storing data received in a handover slot receive time; and a control circuit for detecting whether a handover operation should be completed and, upon detecting that said handover operation should be completed, controlling said switch to route data in said second receive buffer to said decoder for further processing.

2. The device of claim 1 wherein said first addressing means comprising a first address counter which addresses locations in a RAM.

3. The device of claim 1 wherein said first addressing means and said second addressing means each comprise a counter which is presettable to begin addressing at an initial starting position in a RAM.

4. The device of claim 1 wherein said transmit buffer, said first receive buffer, and said second receive buffer form a portion of a RAM.

5. The device of claim 1 wherein said decoder is an adaptive differential pulse code modulation decoder which converts received signals into analog signals.

6. The device of claim 1 wherein said second addressing means addresses data in said first receive buffer and said second receive buffer such that there is no loss of data when switching from said first receive buffer to said second receive buffer.

7. The device of claim 1 wherein said device is located in said handsets and said base stations in said TDMA communication system.

8. The device of claim 1 wherein a determination that a handover is to be completed is based upon the following criteria being satisfied:

no Cyclic Redundancy Check (CRC) errors exist for said data stored in said second receive buffer, a receive signal strength during said handover slot receive time is above a predetermined threshold, and no invalid words exist in said data stored in said second receive buffer.

9. The device of claim 1 wherein said data transmitted in said handover slot transmit time is offset from data transmitted in said original slot transmit time to take into account the number of audio samples which have occurred between said original slot transmit time and said handover slot transmit time.

10. The device of claim 1 wherein said first addressing means and said second addressing means are located within a sequencer in said handsets and said base stations.

11. The device of claim 1 wherein said control circuit maintains said switch to route data in said first receive buffer to said decoder if a predetermined amount of time has expired without detecting whether a handover operation should be completed.

12. A method for performing a seamless handover from an original base station to a handover base station in a TDMA communication system, said system including a plurality of base stations for transmitting bursts of data within time slots to handsets and receiving bursts of data within time slots from said handsets, said slots being arranged in frames, said method comprising the steps of:

transmitting data to said original base station in an original slot transmit time and receiving data from said original base station in an original slot receive time;

determining that a handover operation from said original base station to said handover base station is to commence;

transmitting data in said original slot transmit time and a handover slot transmit time within a single frame;

receiving data in said original slot receive time and a handover slot receive time within said single frame;

storing data from said original slot receive time in address locations in a first storage buffer at particular times and storing data from said handover slot receive time at the same address locations in a second storage buffer at said particular times;

decoding received data within said original slot receive time and converting said received data into decoded signals;

determining that data received in said handover slot receive time meets predetermined criteria for said data to be error-free;

decoding received data within said handover slot receive time from said second storage buffer and converting said received data into decoded signals; and ceasing transmission of data in said original slot transmit time and ceasing reception of data in said original slot receive time.

13. The method of claim 12 wherein determining that said data in said handover slot receive time is error-free comprises determining whether all the following conditions are met:

no Cyclic Redundancy Check (CRC) errors exist for said data received in said handover slot receive time, a receive signal strength during said handover slot receive time is above a predetermined threshold, and no invalid code words exist in said data received during said handover slot receive time.

14. The method of claim 12 wherein said step of transmitting data comprises transmitting data in said handover slot transmit time which is offset from data transmitted in said original slot transmit time by the number of data samples taken between said original slot transmit time and said handover slot transmit time.

15. The method of claim 12 further comprising the step of abandoning continued performance of said step of determining that a handover operation from said original base station to said handover base station is to commence through said step of ceasing transmission and reception of data if a valid handover is not detected within a predetermined time period.

16. The method of claim 12 wherein the step of ceasing reception of data in said original slot receive time comprises switching processing data from said first storage buffer to processing data from said second storage buffer.

* * * * *